(12) United States Patent
Suresh et al.

(10) Patent No.: US 10,218,497 B2
(45) Date of Patent: Feb. 26, 2019

(54) HYBRID AES-SMS4 HARDWARE ACCELERATOR

(71) Applicant: Intel Corporation, Santa Clara, CA (US)

(72) Inventors: Vikram Suresh, Hillsboro, OR (US); Sudhir Satpathy, Hillsboro, OR (US); Sanu Mathew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 15/252,741

(22) Filed: Aug. 31, 2016

(65) Prior Publication Data
US 2018/0062829 A1    Mar. 1, 2018

(51) Int. Cl.
*G06F 9/30* (2018.01)
*G09C 1/00* (2006.01)
*H04L 9/06* (2006.01)

(52) U.S. Cl.
CPC ........ *H04L 9/0631* (2013.01); *G06F 9/30007* (2013.01); *G09C 1/00* (2013.01); *H04L 9/0637* (2013.01); *H04L 2209/12* (2013.01); *H04L 2209/24* (2013.01)

(58) Field of Classification Search
CPC ....... H04L 9/0637; H04L 9/14; H04L 9/8038; H04L 9/30; H04L 9/0631; G06F 21/602
USPC ............................. 380/28; 712/210; 713/190
See application file for complete search history.

(56) References Cited

U.S. PATENT DOCUMENTS

| | | | |
|---|---|---|---|
| 2010/0254530 A1* | 10/2010 | Wang | H04L 9/0618 380/28 |
| 2012/0076294 A1 | 3/2012 | Koo et al. | |
| 2013/0080791 A1* | 3/2013 | Brizek | G06F 12/145 713/190 |
| 2014/0229741 A1 | 8/2014 | Mathew et al. | |
| 2015/0067302 A1* | 3/2015 | Gueron | G06F 7/00 712/210 |
| 2015/0086007 A1* | 3/2015 | Mathew | H04L 9/0631 380/28 |

(Continued)

OTHER PUBLICATIONS

Weiwei Yan, Low-cost reconfigurable VLSI implementation of the SMS4 and AES algorithms, Dec. 11, 2009, IEEE.*

(Continued)

*Primary Examiner* — Shewaye Gelagay
*Assistant Examiner* — Moeen Khan
(74) *Attorney, Agent, or Firm* — Lowenstein Sandler LLP

(57) ABSTRACT

A hybrid AES-SMS4 hardware accelerator is described. A System on Chip implementing a hybrid AES-SMS4 hardware accelerator may include a processor core and a single hardware accelerator coupled to the processor core, the single hardware accelerator to encrypt or decrypt data. The single hardware accelerator may include a first block cipher to encrypt or decrypt the data according to a first encryption algorithm and a second block cipher to encrypt or decrypt the data according to a second encryption algorithm. The accelerator may further include a combined substitution box (Sbox) coupled to the first block cipher and the second block cipher, the combined Sbox comprising logic to perform Galois Field (GF) multiplications and inverse computations, wherein the inverse computations are common to the first block cipher and the second block cipher.

20 Claims, 15 Drawing Sheets

(56) References Cited

U.S. PATENT DOCUMENTS

2015/0341168 A1* 11/2015 Gueron ................ H04L 9/0838
   380/28
2016/0050065 A1* 2/2016 Michiels ............... H04L 9/0631
   380/28
2016/0191238 A1 6/2016 Yap et al.

OTHER PUBLICATIONS

International Search Report and Written Opinion dated Nov. 8, 2017, on application No. PCT/US2017/045155.

* cited by examiner

HYBRID AES-SMS4 HARDWARE ACCELERATOR

The present disclosure pertains to the field of processors and, in particular, to a hybrid AES-SMS4 hardware accelerator.

BACKGROUND

The Advanced Encryption Standard (AES) is a specification for the encryption of electronic data established by the U.S. National Institute of Standards and Technology (NIST) in 2001. AES has been adopted by the U.S. government and is now used worldwide. It supersedes the Data Encryption Standard (DES), which was published in 1977. The algorithm described by AES is a symmetric-key algorithm, meaning the same key is used for both encrypting and decrypting the data. SMS4 is a Chinese block cipher standard, mandated for use in China for protecting wireless networks.

BRIEF DESCRIPTION OF THE DRAWINGS

Various embodiments of the present disclosure will be understood more fully from the detailed description given below and from the accompanying drawings of various embodiments of the disclosure. The drawings, however, should not be taken to limit the disclosure to the specific implementations, but are for explanation and understanding only.

DESCRIPTION OF EMBODIMENTS

Figure 1:
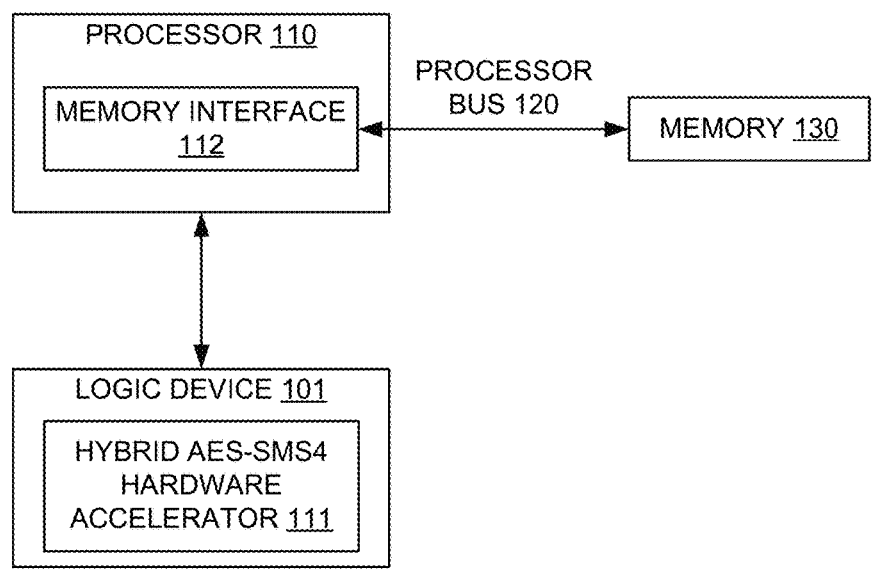
FIG. 1 is a block diagram illustrating a computing system that implements a hybrid AES-SMS4 hardware accelerator according to one embodiment.

Advanced Encryption Standard (AES) is one symmetric-key cipher used as a standard all over the world. SMS4 is a relatively recent block cipher standard for WAPI adopted by the China Information Security Standardization Technical Committee for wireless networks. SMS4 may be equivalent to AES-128 with respect to the level of security, and SMS4 is being mandated as the encryption standard in China. Although both AES and SMS4 ciphers may perform similar Substitution Box (Sbox) operations, they use vastly different Galois-field (GF) $GF(2^8)$ reduction polynomials.

In one embodiment, an Sbox is a basic component of symmetric key algorithms which performs substitution. In general, an Sbox may take some number of input bits, m, and transform them into some number of output bits, n, where n is not necessarily equal to m. In one embodiment, the finite field with $p^n$ elements is denoted $GF(p^n)$ and is called the Galois Field. GF(p), where p is a prime number, may be the ring of integers modulo p.

AES may use the $GF(2^8)$ reduction polynomial $x^8+x^4+x^3+x+1$ while SMS4 may use the $GF(2^8)$ reduction polynomial $x^8+x^7+x^6+x^5+x^4+x^2+1$. The choice of reduction polynomial differentiates the logic for Galois Field multiplications and inverse computations, thus requiring the use of separate circuits for AES and SMS4 hardware implementations. Implementing separate dedicated hardware accelerators for AES and SMS4 is clumsy and inefficient, and may result in significant area and power overhead.

The embodiments described herein may address separate AES and SMS hardware limitations by describing a fully synthesizable hybrid hardware accelerator that can be reconfigured to support AES and/or SMS4 encryption and/or decryption. AES and SMS4 ciphers consist of three main components: (1) The Addition of a round key to intermediate round data; (2) Substitute Box (Sbox) operations; and (3) Mixing at byte boundaries using XOR or mixed column operations. Off these, the Sbox may include the most area and performance critical operations. In one embodiment, a 128-bit encrypt/decrypt datapath for AES includes 16 Sbox modules for round computation and 4 Sbox modules for on-the-fly key expansion. In one embodiment, for on-the-fly key expansion the key for the next round may be computed in parallel with the current encrypt/decrypt round. The user and/or program may not provide the key for each round; the accelerator performs the expansion internally after the initial key is received. A 128-bit SMS4 datapath includes 4 Sbox modules for round computation and 4 Sbox modules for key expansion.

The hybrid encrypt/decrypt hardware accelerator described herein may result in significant area improvement over separate AES/SMS4 datapath implementations. The area savings may be achieved by using common Galois-field inversion circuits (which may result in 40% Sbox area reduction vs. separate AES/SMS4 Sbox implementations) and composite Galois field arithmetic (e.g., choosing ground and extension field polynomials that work for both AES and SMS4 computations, which may result in an additional 16% area reduction). The hybrid AES-SMS4 hardware accelerator described herein may be implemented in any logic device, including, but not limited to, Processors, SoCs and FPGA platforms.

FIG. 1 is a block diagram illustrating a computing system that implements a hybrid AES-SMS4 hardware accelerator according to one embodiment. The computing system 100 is formed with a processor 110 that includes a memory interface 112. The computing system 100 may be any device or combination of devices, but the description of various embodiments described herein is directed to processing devices and programmable logic devices.

System 100 includes a memory interface 112 and memory 130. In one embodiment, memory interface 112 may be a bus protocol for communication from processor 110 to memory 130. Memory 130 includes a dynamic random access memory (DRAM) device, a static random access memory (SRAM) device, flash memory device, or other memory device. Memory 130 stores instructions and/or data represented by data signals that are to be executed by the processor 110. The processor 110 is coupled to the memory 130 via a processor bus 120. A system logic chip, such as a memory controller hub (MCH) may be coupled to the processor bus 120 and memory 130. An MCH can provide a high bandwidth memory path to memory 130 for instruction and data storage and for storage of graphics commands, data and textures. The MCH can be used to direct data signals between the processor 110, memory 130, and other components in the system 100 and to bridge the data signals between processor bus 120, memory 130, and system I/O, for example. The MCH may be coupled to memory 130 through a memory interface (e.g., memory interface 112). In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 130, chipset, and processor 110. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can include a hard disk drive, a floppy disk drive, a CD-ROM device, a flash memory device, or other mass storage device.

System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments described herein are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

Processor 110 may include one or more execution units. One embodiment may be described in the context of a single processor desktop or server system, but alternative embodiments may be included in a multiprocessor system. System 100 may be an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus 120 that transmits data signals between the processor 110 and other components in the system 100. Other elements of system 100 may include a graphics accelerator, memory controller hub, I/O controller hub, wireless transceiver, Flash BIOS, Network controller, Audio controller, Serial expansion port, I/O controller, etc.

In one embodiment, the processor 110 includes a Level 1 (L1) internal cache memory. Depending on the architecture, the processor 110 may have a single internal cache or multiple levels of internal caches. Other embodiments include a combination of both internal and external caches depending on the particular implementation and needs.

For another embodiment of a system, a hybrid AES-SMS4 hardware accelerator may be included on a system on a chip (SoC). One embodiment of a SoC includes of a processor and a memory. The memory of the SoC may be a flash memory. The flash memory can be located on the same die as the processor and other system components. Additionally, other logic blocks such as a memory controller or graphics controller can also be located on a SoC.

System 100 includes a logic device (LD) 101 operatively coupled to the processor 110. LD may be a programmable logic device (PLD) or a non-programmable logic device. In one embodiment, LD 101 may be a field-programmable gate array (FPGA). In other embodiments, LD 101 may be a complex programmable logic device, Generic array logic, programmable logic array, or other type of LD. In one embodiment, processor 110 and LD 101 may be included on a single circuit board, each in their respective locations.

LD 101 is an integrated circuit used to build reconfigurable and/or non-reconfigurable digital circuits. The LD 101 can be an electronic component used in connection with other components or other integrated circuits, such as processor 110. In general, PLDs can have undefined functions at the time of manufacturing and can be programmed or reconfigured before use. The LD 101 can be a combination of a logic device and a memory device. The memory of the LD 101 can store a pattern that was given to the integrated circuit during programming. Data can be stored in the integrated circuit using various technologies, such as anti-fuses, Static Random Access Memory (SRAM), EPROM cells, EEPROM cells, flash memory, or the like. The LD 101 can use any type of LD technology.

In one embodiment, LD 101 includes hybrid AES-SMS4 hardware accelerator 111 to perform inverse operations in the ground field of $GF(2^4)$ (instead of $GF(2^8)$) by selecting common ground-field and extension-field polynomials that work for both AES and SMS4. This enables the area and performance critical inverse computation to be shared between the two ciphers resulting in a compact, hybrid Sbox design (e.g., the design of hybrid AES-SMS4 hardware accelerator 111). Further details describing the layout and functionality of hybrid AES-SMS4 hardware accelerator 111 are described with respect to FIGS. 2-16.

Figure 2:
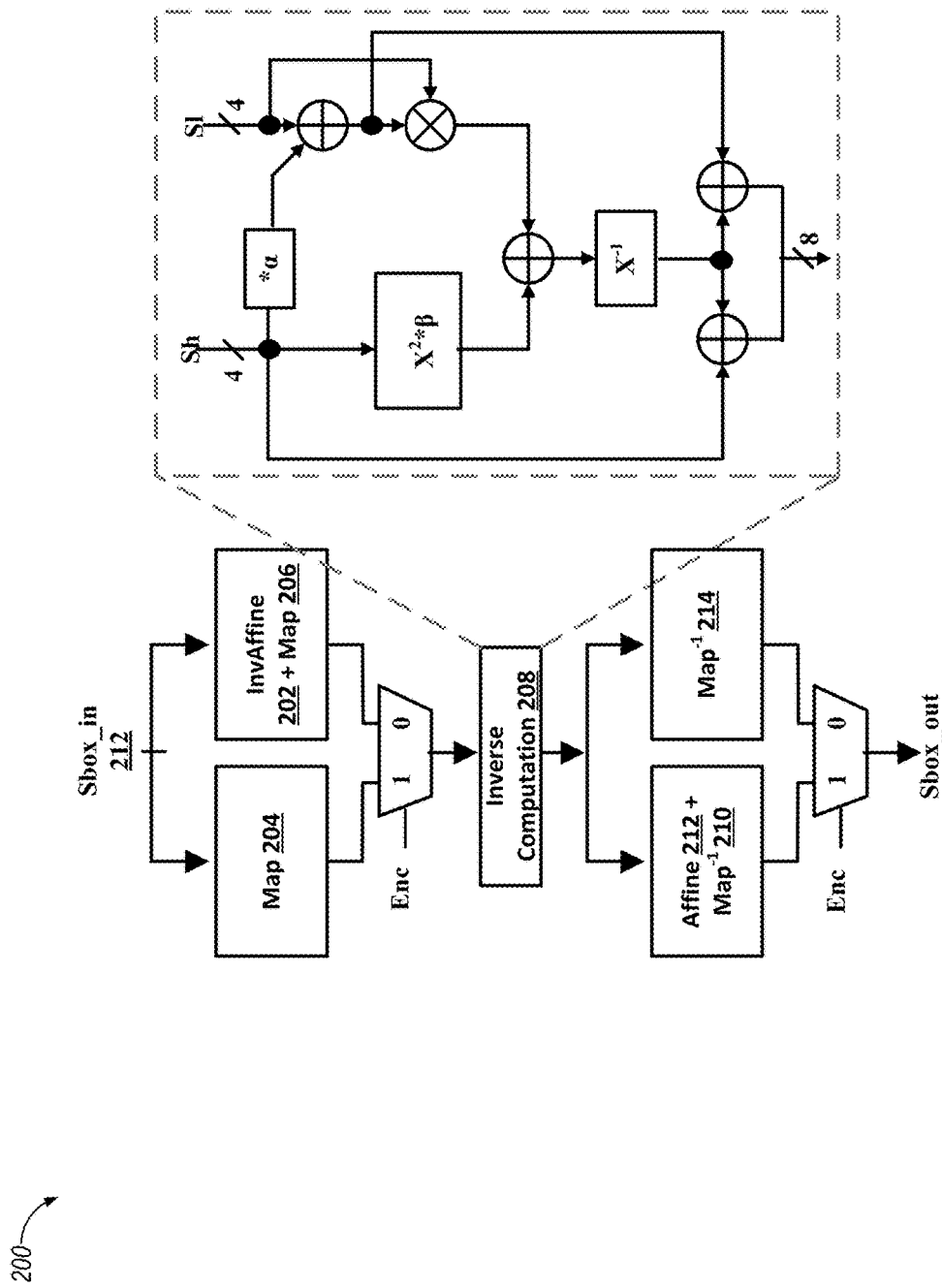
FIG. 2 is a block diagram illustrating an AES encrypt/decrypt combined Sbox according to one embodiment.
Figure 3:
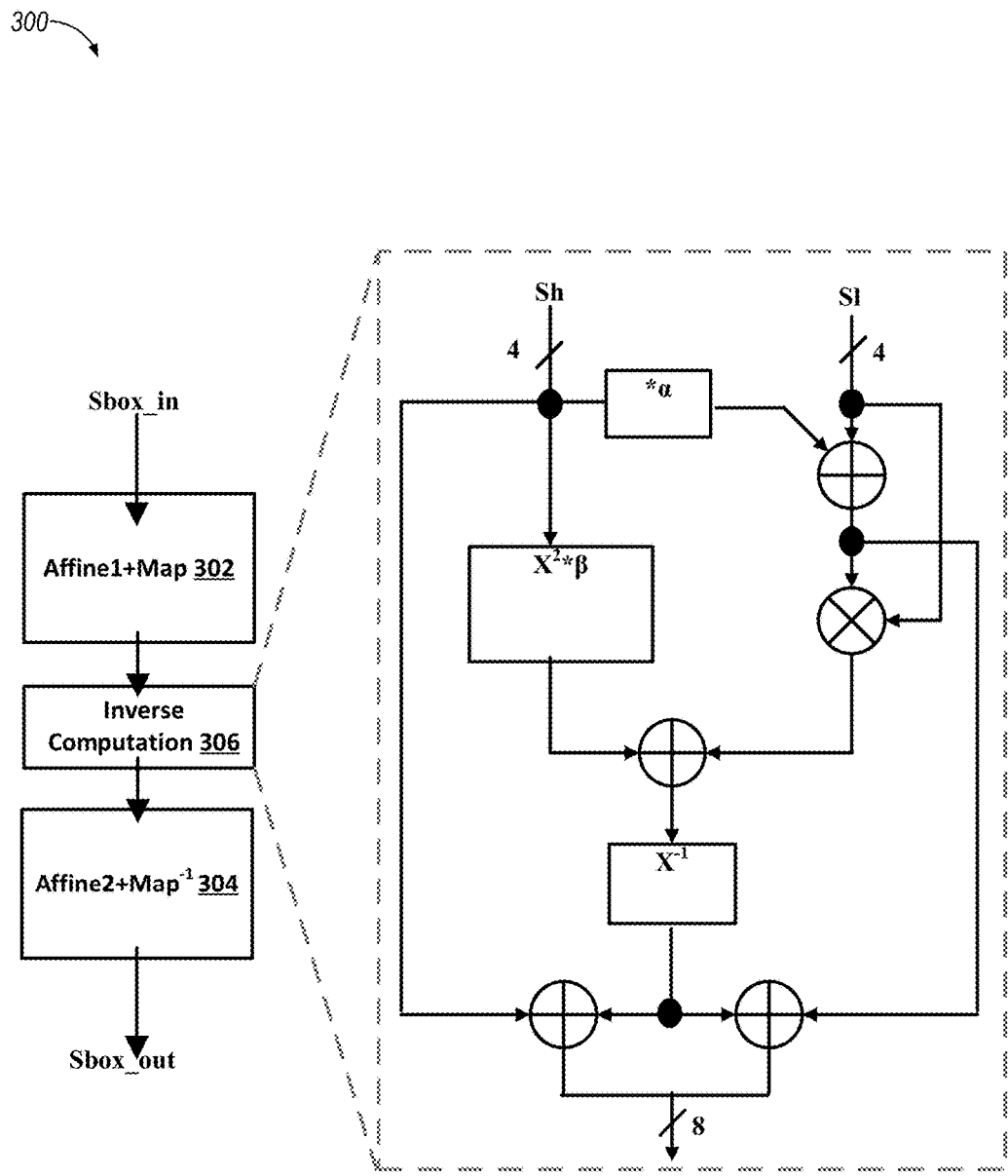
FIG. 3 is a block diagram illustrating an SMS4 Sbox with fused double affine and map according to one embodiment.

FIG. 2 is a block diagram illustrating an AES encrypt/decrypt combined Sbox according to one embodiment. In one embodiment, an AES encrypt/decrypt Sbox operation consists of affine transformations 202, 208, mapping operations 204, 206, 210, 214 and an inverse computation 208 in the Galois Field $GF(2^8)$. The inverse computation may be area and performance critical in an Sbox, constituting more than 70% of the cell area. To reduce the complexity of the inverse computation, the 8-bit Sbox input 212 may be mapped from $GF(2^8)$ to a composite field $GF(2^4)^2$ and the inverse computation may then be performed in $GF(2^4)$. For example, in the AES Sbox 200, during encrypt, the Sbox_in [7:0] 212 may be mapped 204 to the composite field $GF(2^4)^2$ and the inverse computed 208 in $GF(2^4)$. The affine transformation 212 may then be merged with the inverse map 210 to map the output from $GF(2^4)^2$ to $GF(2^8)$. During decrypt, the Inverse Affine matrix 202 may be merged with the map 206 to obtain the transformed output in $GF(2^4)^2$ and the output of inverse computation 208 may be mapped 214 back to the field $GF(2^8)$. In one embodiment, the following polynomials may be used for AES Sbox 200:

$f(x)=x^8+x^4+x^3+x+1$      Reduction polynomial in $GF(2^8)$:

$g(x)=x^4+a_3 \cdot x^3+a_2 \cdot x^2+a_1 \cdot x^1+a_0 \cdot 1$      Ground-field polynomial:

$p(x)=x^2+\alpha \cdot x+\beta, \beta \in GF(2^4)$      Extension-field polynomial:

FIG. 3 is a block diagram illustrating an SMS4 Sbox with fused double affine and map according to one embodiment. In the SMS4 Sbox 300 the fused double affine transformations 302, 304 perform the mapping and inverse mapping between the fields $GF(2^8)$ and $GF(2^4)^2$, enabling inverse computation 306 in the composite field $GF(2^4)$. The Sbox operation in SMS4 may be identical for both encrypt and decrypt modes.

In one embodiment, the following polynomials may be used for SMS4 Sbox 300:

$f(x)=x^8+x^7+x^6+x^5+x^4+x^2+1$      Reduction polynomial in $GF(2^8)$:

$g(x)=x^4+a_3 \cdot x^3+a_2 \cdot x^2+a_1 \cdot x^1+a_0 \cdot 1$      Ground-field polynomial:

$p(x)=x^2+\alpha \cdot x+\beta, \beta \in GF(2^4)$      Extension-field polynomial:

It should be noticed that the reduction polynomials for the AES and the SMS4 ciphers are different, thus separate hardware implementation in $GF(2^8)$. However, inverse computation in the composite field $GF(2^4)$ allows the selection of an identical pair of ground and extension field polynomial pair to share the inverse computation between the AES Sbox and the SMS4 Sbox.

Figure 4:
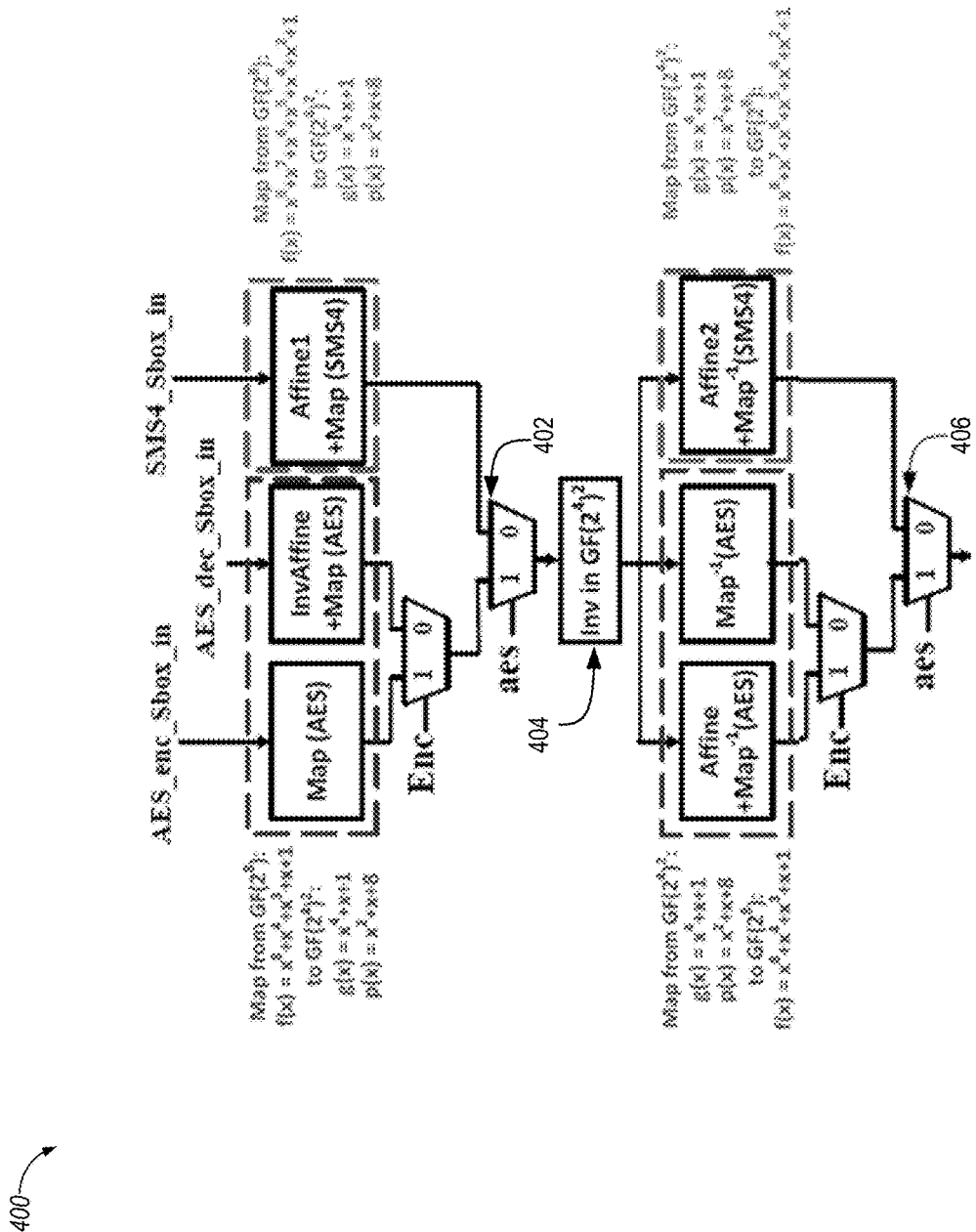
FIG. 4 is a block diagram illustrating a hybrid AES-SMS4 encrypt and decrypt round Sbox according to one embodiment.

FIG. 4 is a block diagram illustrating a hybrid AES-SMS4 encrypt and decrypt round Sbox according to one embodiment. A 2:1 multiplexer 402 prior to inverse computation 404 may select between the AES or the SMS4 input based on the cipher in operation. Similarly, an additional 2:1 multiplexer 406 may select the final Sbox output. Since inverse computation 404 may constitute roughly 70% of the Sbox area, sharing the inverse 404 in the hybrid Sbox 400 may result in a 40% area improvement over separate AES and SMS4 Sbox implementation.

Figure 5:
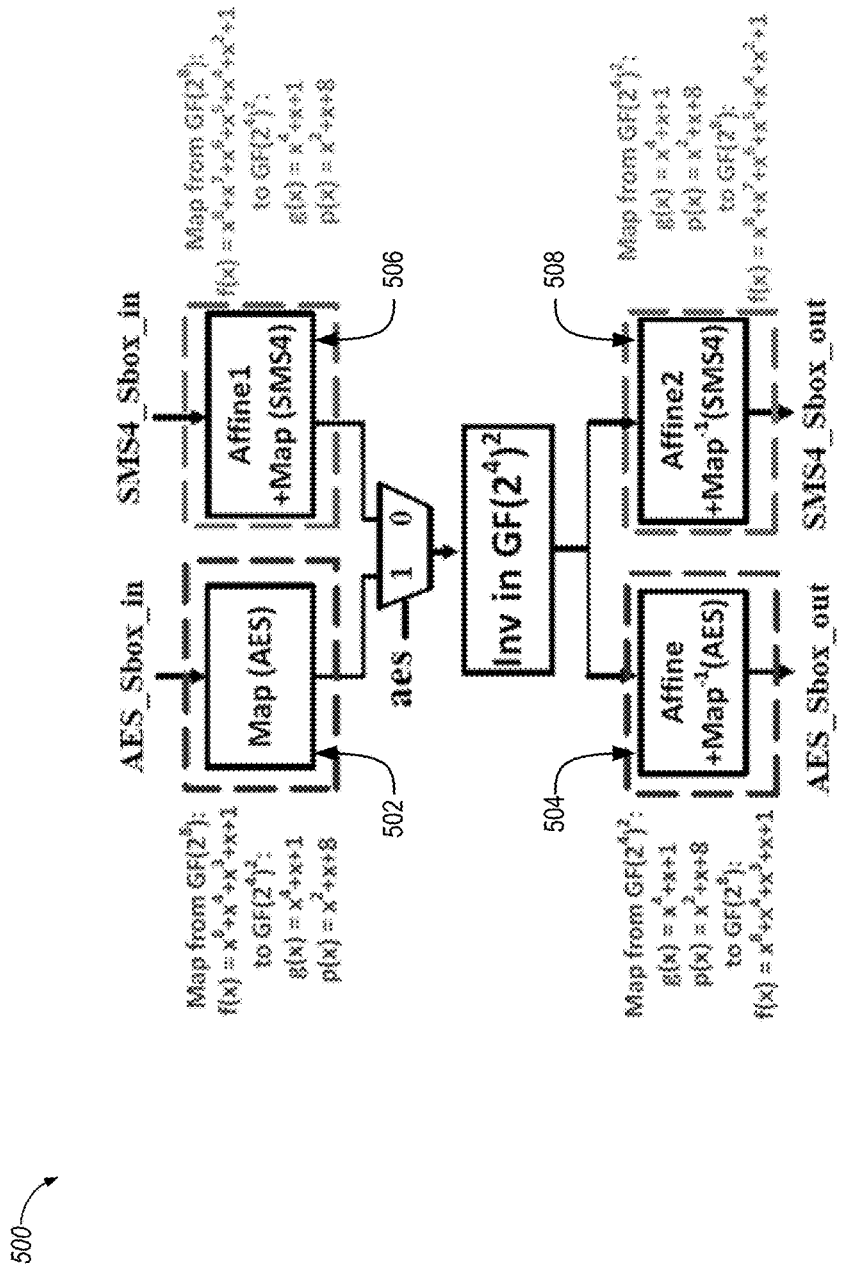
FIG. 5 is a block diagram illustrating a hybrid AES-SMS4 encrypt and decrypt key expansion Sbox according to one embodiment.

In one embodiment, an AES input may be mapped to $GF(2^4)^2$ (thus allowing inverse computation in $GF(2^4)$) according to the following:

$f(x)=x^8+x^4+x^3+x+1$      Map from/to $GF(2^8)$:

$x^4+x+1$ and $x^2+x+8$      to/from $GF(2^4)^2$:

In another embodiment, a SMS4 input may be mapped to $GF(2^4)^2$ (thus allowing inverse computation in $GF(2^4)$) according to the following:

$f(x)=x^8+x^7+x^6+x^5+x^4+x^2+1$      Map from/to $GF(2^8)$:

$x^4+x+1$ and $x^2+x+8$      to/from $GF(2^4)^2$:

FIG. 5 is a block diagram illustrating a hybrid AES-SMS4 encrypt and decrypt key expansion Sbox according to one embodiment. For key expansion, AES does not require an Inverse affine operation. As a result, the hybrid Sbox 500 consists of a map function 502 and fused affine/map 504 for AES and double fused affine/map 506, 508 for SMS4.

Figure 6:
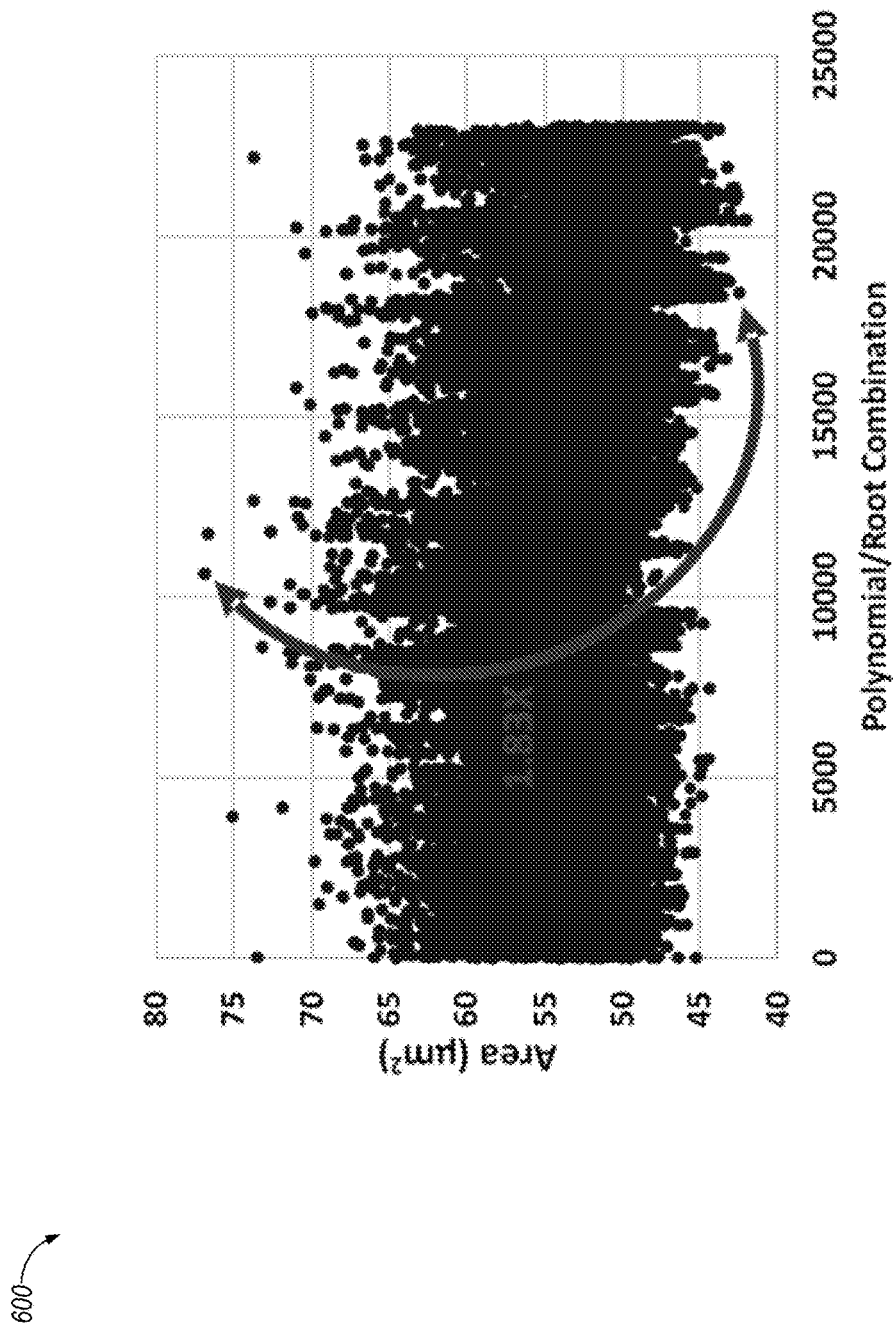
FIG. 6 is a graph diagram illustrating distribution of hybrid Sbox area for various polynomial combinations according to one embodiment.

FIG. 6 is a graph diagram illustrating distribution of hybrid Sbox area for various polynomial combinations according to one embodiment. The mapping matrix for conversion from $GF(2^8)$ to $GF(2^4)^2$ and vice versa may be obtained by representing the root Δ of the reduction polynomial f(x) in terms of the roots of the ground-field polynomial g(x) and extension-field polynomial p(x). In one embodiment, the ground-field polynomial and the extension-field polynomial are optimized to be common computations by the Sbox for the first block cipher and the second block cipher in the composite field $GF(2^4)$.

In one embodiment, out of the 4,096 possible combinations of g(x) and p(x), 360 pairs satisfy the condition of being irreducible and having a primitive root in the ground-field. Since the reduction polynomials for AES and SMS4 are different for a given g(x) and p(x), there may exist 8 unique roots of $f_{AES}(x)$ and $f_{SMS4}(x)$ respectively, resulting in 64 unique combinations. This results in a total of 360*64=23040 potential combinations for mapping the Sbox inputs between the two fields. The choice of g(x) and p(x) may affect the area and critical path of the inverse computation. The choice of root may affect the mapping matrices and hence the fused affine/map logic.

Graph 600 shows the area spread for polynomial exploration across 23,040 combinations. The hybrid Sbox area has a 1.83× spread depending on the choice of ground-field and extension-field polynomials and the roots for AES and SMS4. In one implementation, an SBOX area of 42 μm 2 was obtained for the polynomials x4+x+1 (ground field) and x2+x+8 (extension field) with AES and SMS4 roots of 8'hC3 and 8'h5F, respectively. This is a 50% area improvement compared to separate Sbox implementation for the two ciphers. In various other embodiments, other ground field and extension field polynomials may be used.

Figure 7:
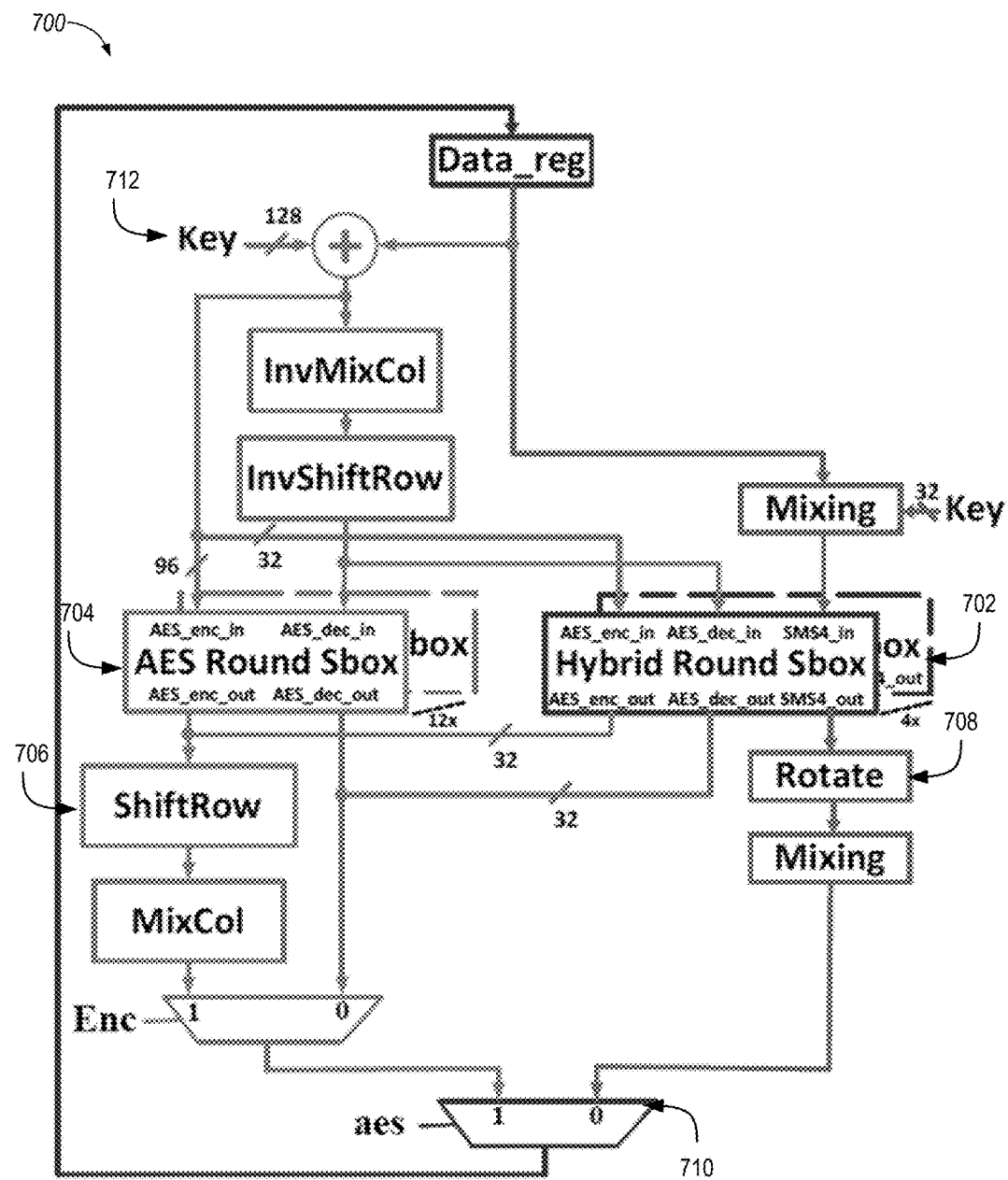
FIG. 7 is a block diagram illustrating a hybrid 128-bit AES-SMS4 encrypt and decrypt round computation datapath according to one embodiment.

FIG. 7 is a block diagram illustrating a hybrid 128-bit AES-SMS4 encrypt and decrypt round computation datapath according to one embodiment. In one embodiment, the 128-bit hybrid AES/SMS4 encrypt/decrypt datapath consists of 4 hybrid Sbox modules 702 and 12 AES Sbox modules 704. The 4 hybrid Sbox modules may receive inputs from both the AES and SMS4 logic. The inputs may be routed to the respective first block cipher operations (e.g., the addition of the round key to intermediate round data 712).

The Sbox output may be routed to the respective second block cipher (e.g., ShiftRow 706 and/or Rotate 708) operations. In one embodiment the combined Sbox is coupled to the first block cipher and the second block cipher, as depicted in FIG. 7. Since the AES round computation 700 includes a total of 16 Sbox modules, the remaining 12 non-hybrid Sbox designs may follow the conventional AES encrypt/decrypt Sbox configuration with a corresponding polynomial pair. The final output may be selected based on the current cipher operation using a 2:1 multiplexer 710.

Figure 8:
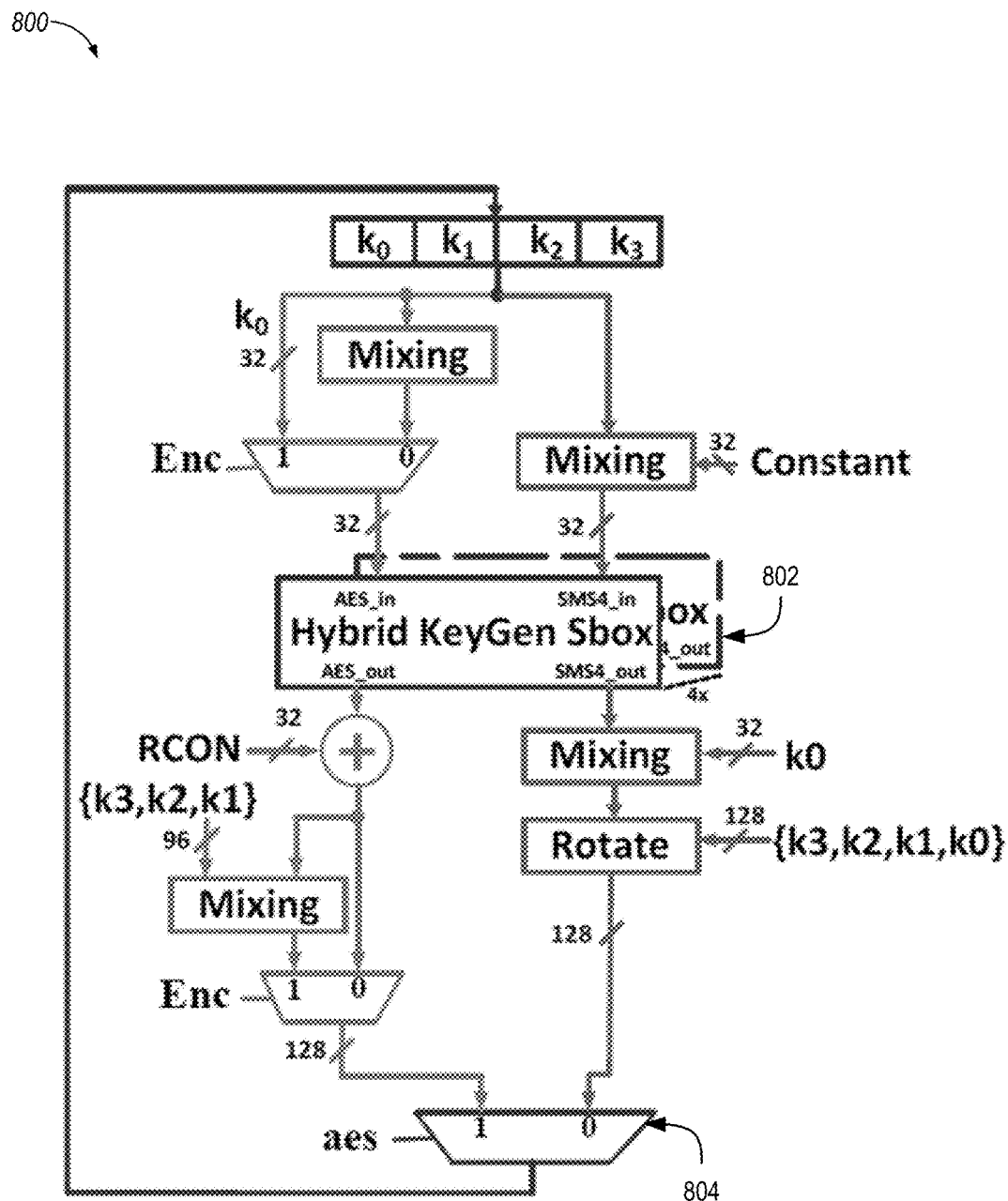
FIG. 8 is a block diagram illustrating a hybrid 128-bit AES-SMS4 encrypt and decrypt key expansion datapath according to one embodiment.

FIG. 8 is a block diagram illustrating a hybrid 128-bit AES-SMS4 encrypt and decrypt key expansion datapath according to one embodiment. Since both AES and SMS4 encrypt and decrypt key expansion utilize only 4 Sbox modules, the optimized hybrid key generation Sbox modules 802 may be used to share the inverse computation without including any Sbox modules solely dedicated to AES or SMS4. Similar to the round computation, the final round key may be selected between the two key expansion datapaths using a 128-bit 2:1 multiplexer 804. Further, in both the round computation and key expansion, the 128-bit intermediate working register and the 128-bit key register may be shared between the two ciphers. This may reduce the overall sequential area and clocking power as compared to separate implementations.

In one embodiment, the hybrid datapath has a 10-cycle and a 32-cycle latency/throughput for AES and SMS4, respectively. The shared Sbox with a corresponding area optimized polynomial may result in a total of 18% cell area reduction.

Figure 9A:
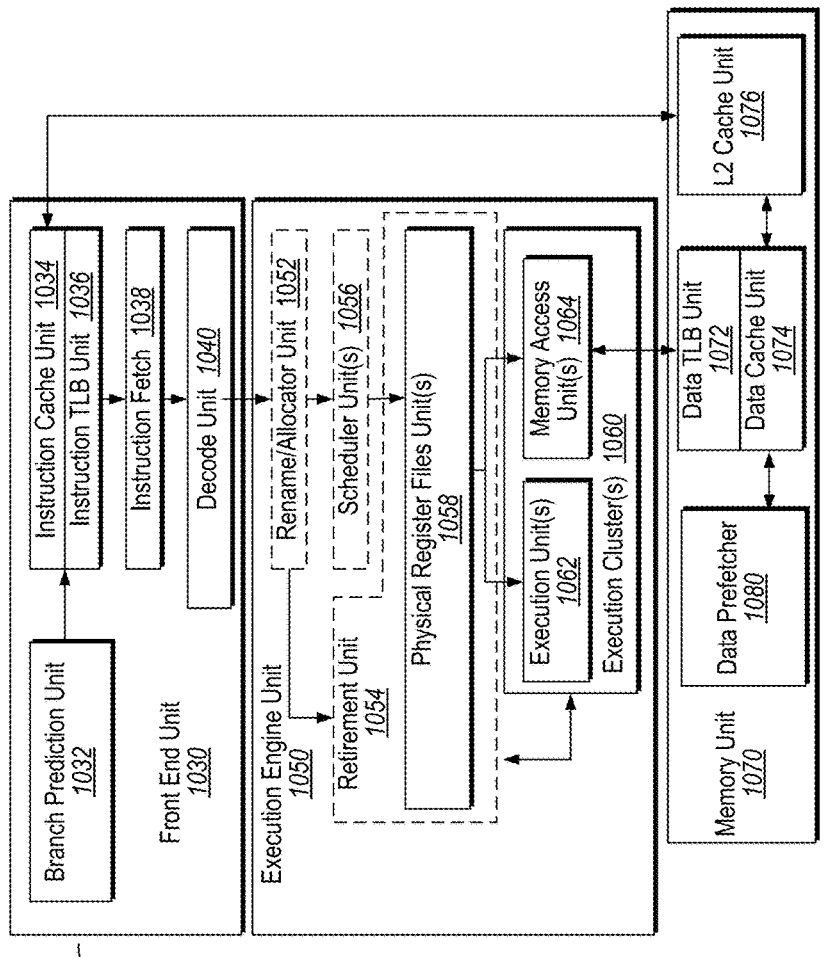
FIG. 9A is a block diagram illustrating a micro-architecture for a processor that implements hybrid AES-SMS4 operations according to one embodiment.

FIG. 9A is a block diagram illustrating a micro-architecture for a processor 1000 that implements hybrid AES-SMS4 hardware accelerator operations, according to one embodiment. Specifically, processor 1000 depicts an in-order architecture core and a register renaming logic, out-of-order issue/execution logic to be included in a processor according to at least one embodiment of the disclosure. The embodiments of the hybrid AES-SMS4 hardware accelerator operations described herein can be implemented in processor 1000.

Processor 1000 includes a front end unit 1030 coupled to an execution engine unit 1050, and both are coupled to a memory unit 1070. The processor 1000 may include a reduced instruction set computing (RISC) core, a complex instruction set computing (CISC) core, a very long instruction word (VLIW) core, or a hybrid or alternative core type. As yet another option, processor 1000 may include a special-purpose core, such as, for example, a network or communication core, compression engine, graphics core, or the like. In one embodiment, processor 1000 may be a multi-core processor or may be part of a multiprocessor system.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (also known as a decoder) may decode instructions and generate as an output one or more micro-operations, micro-code entry points, microinstructions, other instructions, or other control signals, which are decoded from, or which otherwise reflect, or are derived from, the original instructions. The decoder 1040 may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to the memory unit 1070. The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations (RS), central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1058 is overlapped by the retirement unit 1054 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which may include a data prefetcher 1080, a data TLB unit 1072, a data cache unit (DCU) 1074, and a level 2 (L2) cache unit 1076, to name a few examples. In some embodiments DCU 1074 is also known as a first level data cache (L1 cache). The DCU 1074 may handle multiple outstanding cache misses and continue to service incoming stores and loads. It also supports maintaining cache coherency. The data TLB unit 1072 is a cache used to improve virtual address translation speed by mapping virtual and physical address spaces. In one exemplary embodiment, the memory access units 1064 may include a load unit, a store address unit, and a store data unit, each of which is coupled to the data TLB unit 1072 in the memory unit 1070. The L2 cache unit 1076 may be coupled to one or more other levels of cache and eventually to a main memory.

In one embodiment, the data prefetcher 1080 speculatively loads/prefetches data to the DCU 1074 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1000 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9B:
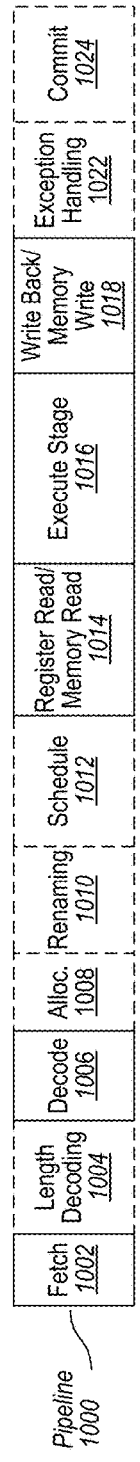
FIG. 9B is a block diagram illustrating an in-order pipeline and a register renaming stage, out-of-order issue/execution pipeline according to one embodiment.

FIG. 9B is a block diagram illustrating an in-order pipeline and a register renaming stage, out-of-order issue/execution pipeline implemented by processor 1000 of FIG. 9A according to some embodiments of the disclosure. The solid lined boxes in FIG. 9B illustrate an in-order pipeline, while the solid lined boxes in combination with the dashed lined boxes illustrate a register renaming, out-of-order issue/execution pipeline. In FIG. 9B, a processor pipeline 1001 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024. In some embodiments, the ordering of stages 1002-1024 may be different than illustrated and are not limited to the specific ordering shown in FIG. 9B.

Figure 10:
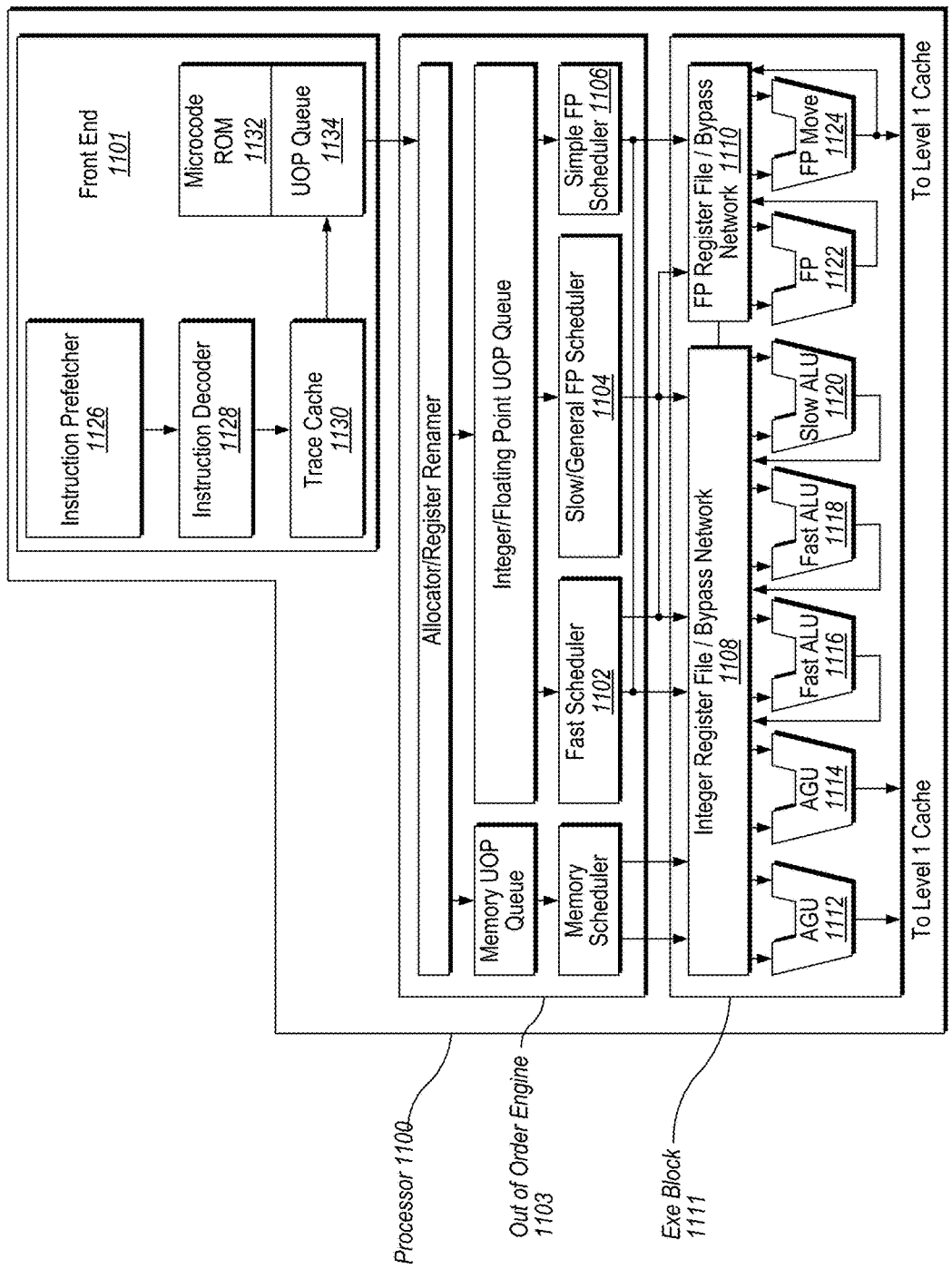
FIG. 10 illustrates a block diagram of the micro-architecture for a processor that includes logic circuits to perform hybrid AES-SMS4 operations according to one embodiment.

FIG. 10 illustrates a block diagram of the micro-architecture for a processor 1100 that includes logic circuits to perform hybrid AES-SMS4 hardware accelerator operations, according to one embodiment. In some embodiments, hybrid AES-SMS4 hardware accelerator operation instructions in accordance with one embodiment can be implemented to operate on data elements having sizes of byte, word, doubleword, quadword, etc., as well as datatypes, such as single and double precision integer and floating point datatypes. In one embodiment the in-order front end 1101 is the part of the processor 1100 that fetches instructions to be executed and prepares them to be used later in the processor pipeline. The embodiments of the hybrid AES-SMS4 hardware accelerator operations disclosed herein can be implemented in processor 1100.

The front end 1101 may include several units. In one embodiment, the instruction prefetcher 1126 fetches instructions from memory and feeds them to an instruction decoder 1128 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1130 takes decoded uops and assembles them into program ordered sequences or traces in the uop queue 1134 for execution. When the trace cache 1130 encounters a complex instruction, the microcode ROM 1132 provides the uops needed to complete the operation.

Some instructions are converted into a single micro-op, whereas others need several micro-ops to complete the full operation. In one embodiment, if more than four micro-ops are needed to complete an instruction, the decoder 1128 accesses the microcode ROM 1132 to do the instruction. For one embodiment, an instruction can be decoded into a small number of micro ops for processing at the instruction decoder 1128. In another embodiment, an instruction can be stored within the microcode ROM 1132 should a number of micro-ops be needed to accomplish the operation. The trace cache 1130 refers to an entry point programmable logic array (PLA) to determine a correct micro-instruction pointer for reading the micro-code sequences to complete one or more instructions in accordance with one embodiment from the micro-code ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1102, slow/general floating point scheduler 1104, and simple floating point scheduler 1106. The uop schedulers 1102, 1104, 1106, determine when a uop is ready to execute based on the readiness of their dependent input register operand sources and the availability of the execution resources the uops need to complete their operation. The fast scheduler 1102 of one embodiment can schedule on each half of the main clock cycle while the other schedulers can only schedule once per main processor clock cycle. The schedulers arbitrate for the dispatch ports to schedule uops for execution.

Register files 1108, 1110, sit between the schedulers 1102, 1104, 1106, and the execution units 1112, 1114, 1116, 1118, 1120, 1122, 1124 in the execution block 1111. There is a separate register file 1108, 1110, for integer and floating point operations, respectively. Each register file 1108, 1110, of one embodiment also includes a bypass network that can bypass or forward just completed results that have not yet been written into the register file to new dependent uops. The integer register file 1108 and the floating point register file 1110 are also capable of communicating data with the other. For one embodiment, the integer register file 1108 is split into two separate register files, one register file for the low order 32 bits of data and a second register file for the high order 32 bits of data. The floating point register file 1110 of one embodiment has 128-bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register files 1108, 1110, that store the integer and floating point data operand values that the micro-instructions need to execute. The processor 1100 of one embodiment includes a number of execution units: address generation unit (AGU) 1112, AGU 1114, fast ALU 1116, fast ALU 1118, slow ALU 1120, floating point ALU 1122, floating point move unit 1124. For one embodiment, the floating point execution blocks 1112, 1114, execute floating point, MMX, SIMD, and SSE, or other operations. The floating point ALU 1112 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1116, 1118. The fast ALUs 1116, 1118, of one embodiment can execute fast operations with an effective latency of half a clock cycle. For one embodiment, most complex integer operations go to the slow ALU 1110 as the slow ALU 1110 includes integer execution hardware for long latency type of operations, such as a multiplier, shifts, flag logic, and branch processing. Memory load/store operations are executed by the AGUs 1112, 1114. For one embodiment, the integer ALUs 1116, 1118, 1120, are described in the context of performing integer operations on 64 bit data operands. In alternative embodiments, the ALUs 1116, 1118, 1120, can be implemented to support a variety of data bits including 16, 32, 128, 256, etc. Similarly, the floating point units 1112, 1114, can be implemented to support a range of operands having bits of various widths. For one embodiment, the floating point units 1112, 1114, can operate on 128-bits wide packed data operands in conjunction with SIMD and multimedia instructions.

In one embodiment, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 1100 also includes logic to implement hybrid AES-SMS4 hardware accelerator operations according to one embodiment. In one embodiment, the execution block 1111 of processor 1100 may include a microcontroller (MCU), to perform BIOS authentication operations according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 11:
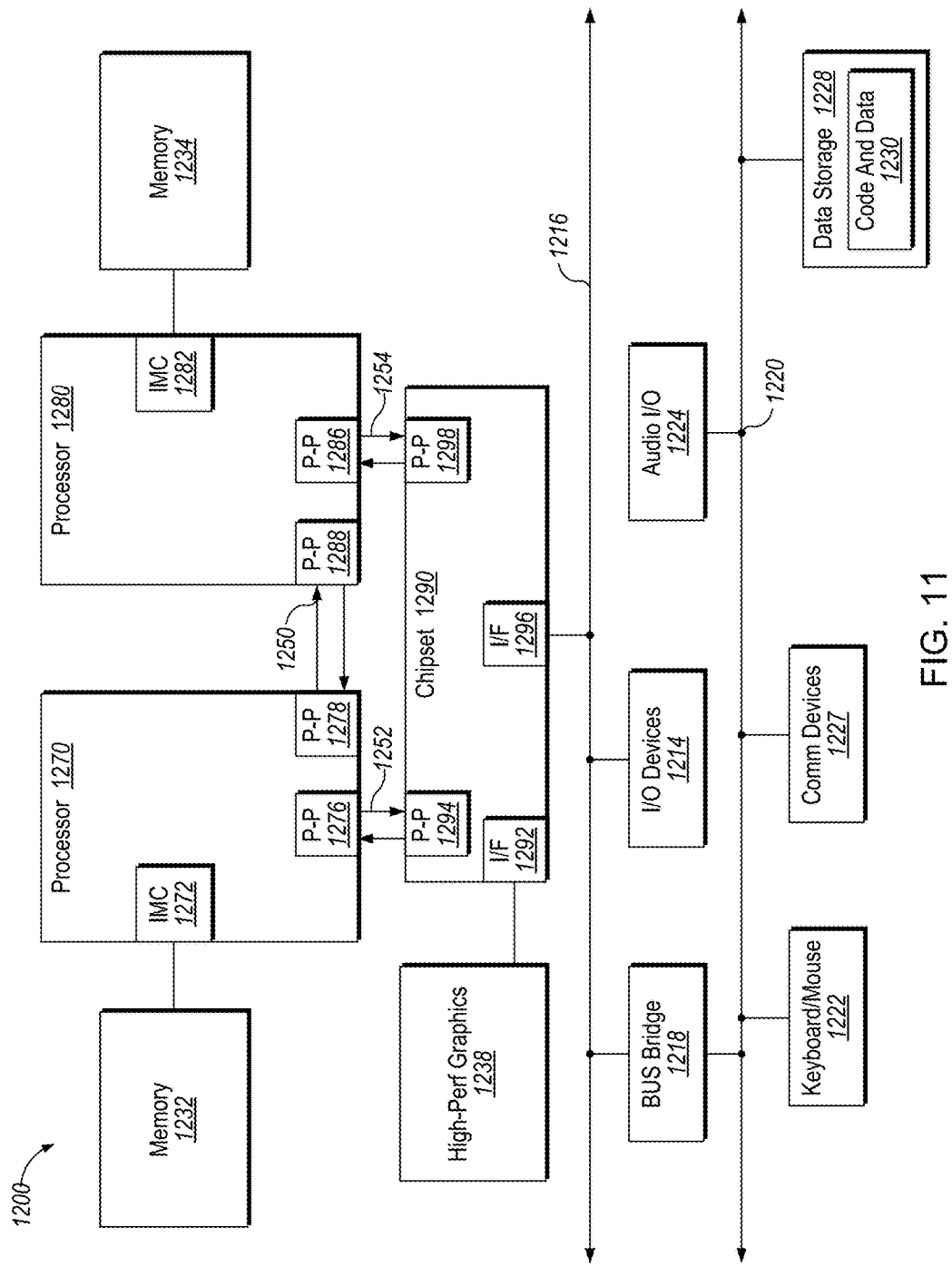
FIG. 11 is a block diagram of a computer system according to one embodiment.

Embodiments may be implemented in many different system types. Referring now to FIG. 11, shown is a block diagram of a multiprocessor system 1200 in accordance with an implementation. As shown in FIG. 11, multiprocessor system 1200 is a point-to-point interconnect system, and includes a first processor 1270 and a second processor 1280 coupled via a point-to-point interconnect 1250. As shown in FIG. 11, each of processors 1270 and 1280 may be multicore processors, including first and second processor cores, although potentially many more cores may be present in the processors. The processors each may include hybrid write mode logics in accordance with an embodiment of the present. Hybrid AES-SMS4 hardware accelerator operations discussed herein can be implemented in the processor 1270, processor 1280, or both.

While shown with two processors 1270, 1280, it is to be understood that the scope of the present disclosure is not so limited. In other implementations, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1288; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 11, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may also exchange information with a high-performance graphics circuit 1238 via a high-performance graphics interface 1239.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1292. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1214 may be coupled to first bus 1216, along with a bus bridge 1218 which couples first bus 1216 to a second bus 1220. In one embodiment, second bus 1220 may be a low pin count (LPC) bus. Various devices may be coupled to second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to second bus 1220. Note that other architectures are possible. For example, instead of the point-to-point architecture of FIG. 11, a system may implement a multi-drop bus or other such architecture.

Figure 12:
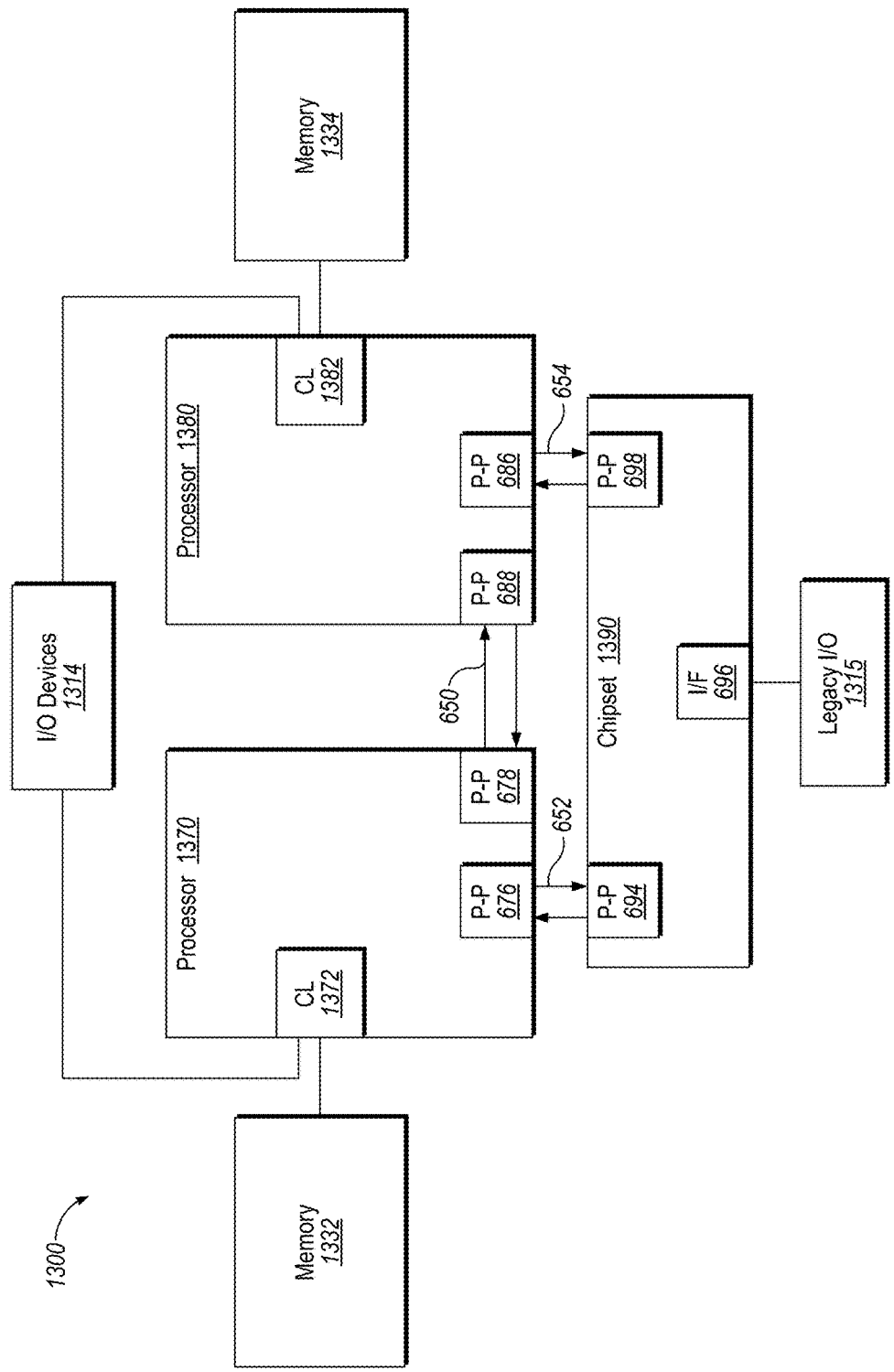
FIG. 12 is a block diagram of a computer system according to another embodiment.

Referring now to FIG. 12, shown is a block diagram of a third system 1300 in accordance with an embodiment of the present disclosure. Like elements in FIGS. 10 and 11 bear like reference numerals, and certain aspects of FIG. 11 have been omitted from FIG. 12 in order to avoid obscuring other aspects of FIG. 12.

Figure 13:
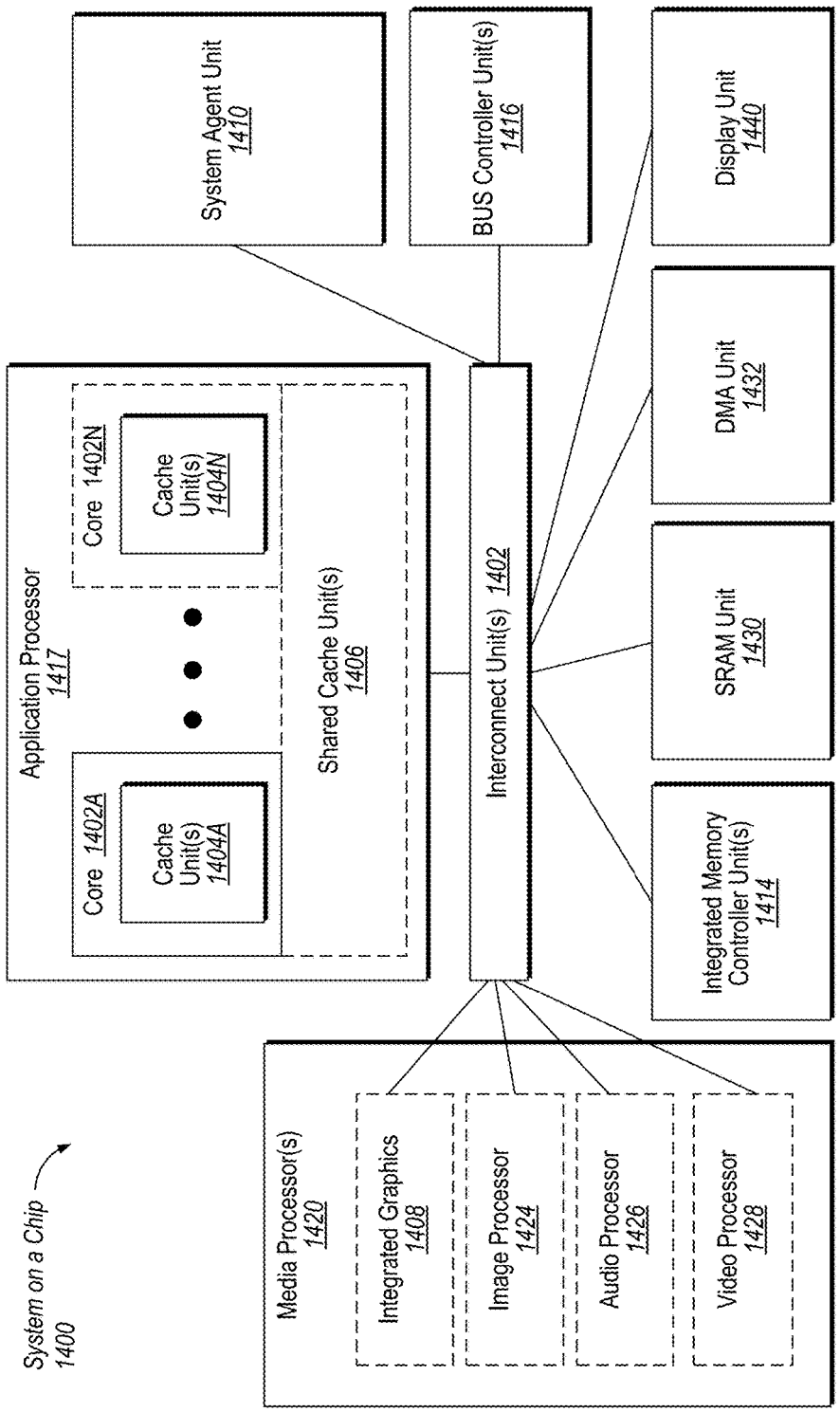
FIG. 13 is a block diagram of a system-on-a-chip according to one embodiment.

FIG. 12 illustrates that the processors 1370, 1380 may include integrated memory and I/O control logic ("CL") 1372 and 1382, respectively. For at least one embodiment, the CL 1372, 1382 may include integrated memory controller units such as described herein. In addition. CL 1372, 1382 may also include I/O control logic. FIG. 13 illustrates that the memories 1332, 1334 are coupled to the CL 1372, 1382, and that I/O devices 1314 are also coupled to the control logic 1372, 1382. Legacy I/O devices 1315 are coupled to the chipset 1390. Operations discussed herein can be implemented in the processor 1370, processor 1380, or both.

FIG. 13 is an exemplary system on a chip (SoC) 1400 that may include one or more of the cores 1402. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 13 is a block diagram of a SoC 1400 in accordance with an embodiment of the present disclosure. Dashed lined boxes are features on more advanced SoCs. In FIG. 13 an interconnect unit(s) 1402 is coupled to: an application processor 1417 which includes a set of one or more cores 1402A-N, cache unit(s) 1404A-N, and shared cache unit(s) 1406; a system agent unit 1410; a bus controller unit(s) 1416; an integrated memory controller unit(s) 1414; a set or one or more media processors 1420 which may include integrated graphics logic 1408, an image processor 1424 for providing still and/or video camera functionality, an audio processor 1426 for providing hardware audio acceleration, and a video processor 1428 for providing video encode/decode acceleration; a static random access memory (SRAM) unit 1430; a direct memory access (DMA) unit 1432; and a display unit 1440 for coupling to one or more external displays. Hybrid AES-SMS4 hardware accelerator operations discussed herein can be implemented by SoC 1400.

Figure 14:
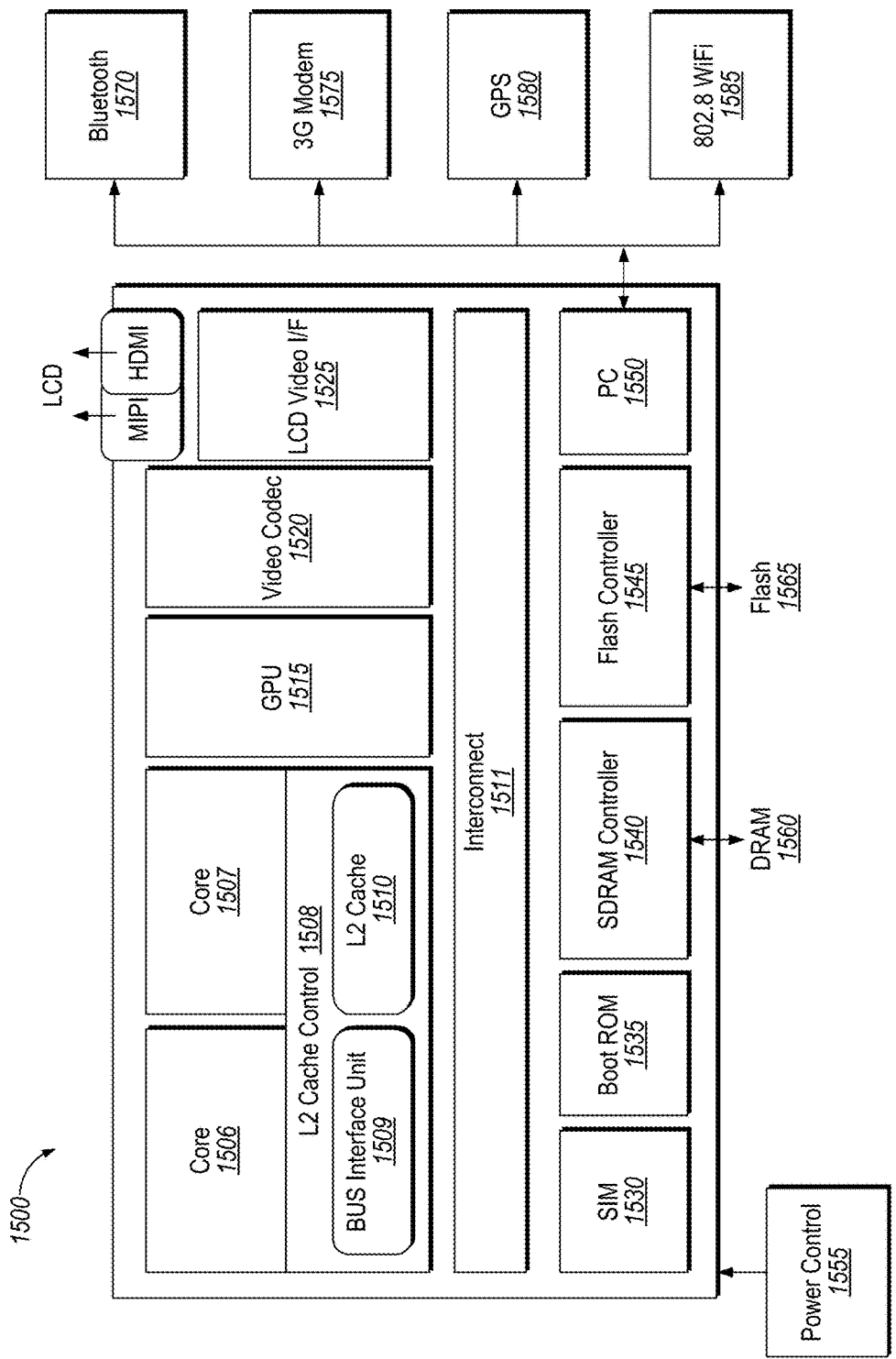
FIG. 14 illustrates another implementation of a block diagram for a computing system according to one embodiment.

Turning next to FIG. 14, an embodiment of a system on-chip (SoC) design in accordance with embodiments of the disclosure is depicted. As an illustrative example, SoC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. Hybrid AES-SMS4 hardware accelerator operations discussed herein can be implemented by SoC 1500.

Here, SoC 1500 includes 2 cores—1506 and 1507. Similar to the discussion above, cores 1506 and 1507 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of system 1500. Interconnect 1511 includes an on-chip interconnect, such as an IOSF, AMBA, or other interconnects discussed above, which can implement one or more aspects of the described disclosure.

Interconnect 1511 provides communication channels to the other components, such as a Subscriber Identity Module (SIM) 1530 to interface with a SIM card, a boot ROM 1535 to hold boot code for execution by cores 1506 and 1507 to initialize and boot SoC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, power control 1555 to control power, video codecs 1520 and Video interface 1525 to display and receive input (e.g. touch enabled input), GPU 1515 to perform graphics related computations, etc. Any of these interfaces may incorporate aspects of the embodiments described herein.

In addition, the system illustrates peripherals for communication, such as a Bluetooth module 1570, 3G modem 1575, GPS 1580, and Wi-Fi 1585. Note as stated above, a UE includes a radio for communication. As a result, these peripheral communication modules may not all be included.

However, in a UE some form of a radio for external communication should be included.

Figure 15:
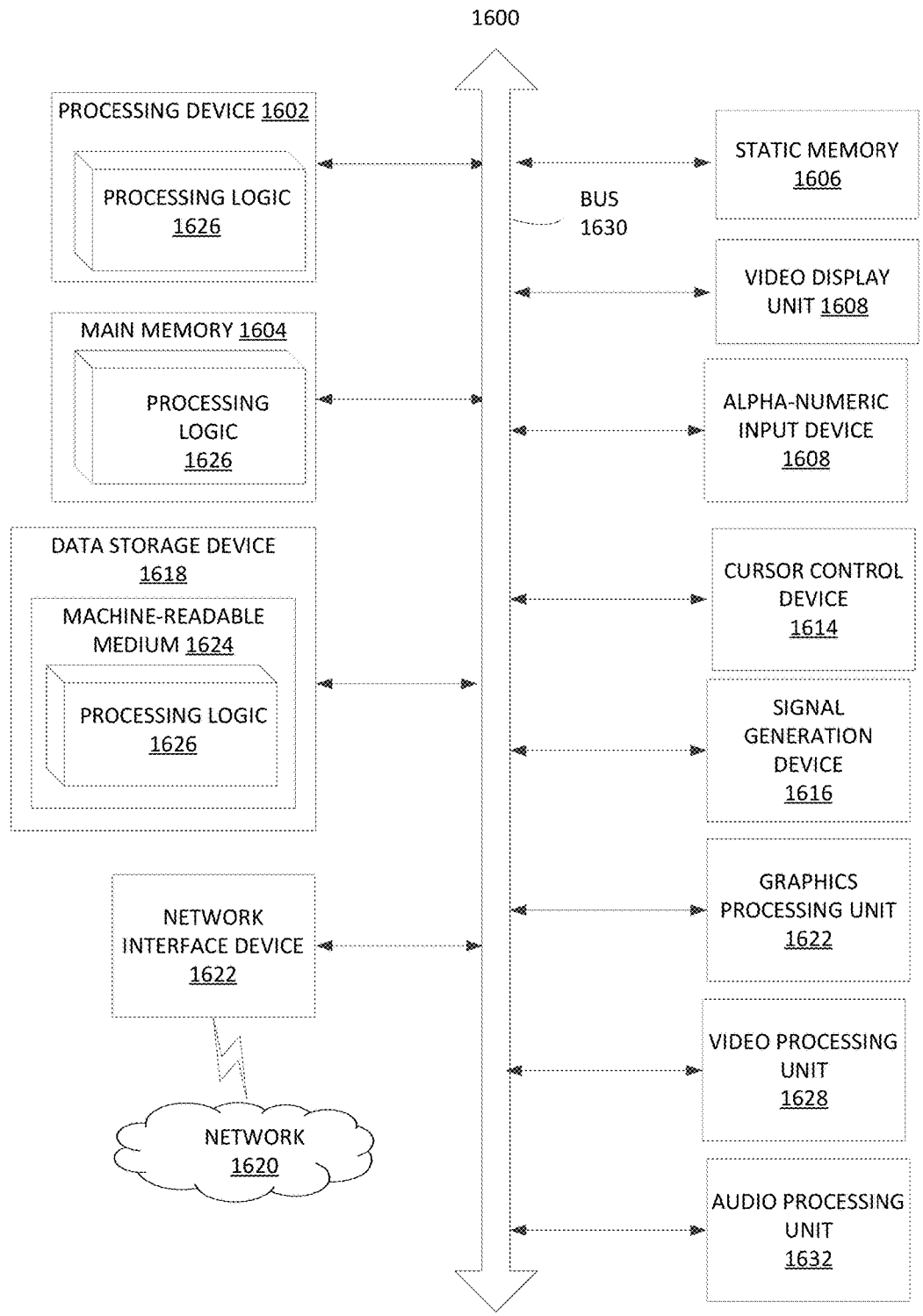
FIG. 15 illustrates another implementation of a block diagram for a computing system according to one implementation.

FIG. 15 illustrates a diagrammatic representation of a machine in the example form of a computing system 1600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1600.

The computing system 1600 includes a processing device 1602, main memory 1604 (e.g., read-only memory (ROM), flash memory, dynamic random access memory (DRAM) (such as synchronous DRAM (SDRAM) or DRAM (RDRAM), etc.), a static memory 1626 (e.g., flash memory, static random access memory (SRAM), etc.), and a data storage device 1618, which communicate with each other via a bus 1630.

Processing device 1602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. In one embodiment, processing device 1602 may include one or processor cores. The processing device 1602 is configured to execute the processing logic 1626 for performing the BIOS authentication operations discussed herein. In one embodiment, processing device 1602 can be part of a computing system. Alternatively, the computing system 1600 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1600 may further include a network interface device 1622 communicably coupled to a network 1620. The computing system 1600 also may include a video display unit 1608 (e.g., a liquid crystal display (LCD) or a cathode ray tube (CRT)), an alphanumeric input device 1610 (e.g., a keyboard), a cursor control device 1614 (e.g., a mouse), a signal generation device 1616 (e.g., a speaker), or other peripheral devices. Furthermore, computing system 1600 may include a graphics processing unit 1622, a video processing unit 1628 and an audio processing unit 1632. In another embodiment, the computing system 1600 may include a chipset (not illustrated), which refers to a group of integrated circuits, or chips, that are designed to work with the processing device 1602 and controls communications between the processing device 1602 and external devices. For example, the chipset may be a set of chips on a motherboard that links the processing device 1602 to very high-speed devices, such as main memory 1604 and graphic controllers, as well as linking the processing device 1602 to lower-speed peripheral buses of peripherals, such as USB, PCI or ISA buses.

The data storage device 1618 may include a computer-readable storage medium 1624 on which is stored software 1626 embodying any one or more of the methodologies of functions described herein. The software 1626 may also reside, completely or at least partially, within the main memory 1604 as instructions 1626 and/or within the processing device 1602 as processing logic 1626 during execution thereof by the computing system 1600; the main memory 1604 and the processing device 1602 also constituting computer-readable storage media.

The computer-readable storage medium 1624 may also be used to store instructions 1626 utilizing the processing device 1602 and/or a software library containing methods that call the above applications. While the computer-readable storage medium 1624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a System on Chip (SoC) comprising: a processor core; and a single hardware accelerator coupled to the processor core, the single hardware accelerator to encrypt or decrypt data, the single hardware accelerator comprising: a first block cipher to encrypt or decrypt the data according to a first encryption algorithm; a second block cipher to encrypt or decrypt the data according to a second encryption algorithm; and a combined substitution box (Sbox) coupled to the first block cipher and the second block cipher, the combined Sbox comprising logic to perform Galois Field (GF) multiplications and inverse computations, wherein the inverse computations are common to the first block cipher and the second block cipher.

In Example 2, the subject matter of Example 1, the single hardware accelerator is reconfigurable to implement either the first encryption algorithm or the second encryption algorithm, and wherein the first encryption algorithm is an Advanced Encryption Standard (AES) encryption algorithm and the second encryption algorithm is a SMS4 encryption algorithm.

In Example 3, the subject matter of Example 2, the SoC further comprises a 128-bit encrypt/decrypt datapath, the datapath comprising 12 AES Sbox modules and 4 hybrid Sbox modules for round computation, and 4 hybrid Sbox modules for key expansion.

In Example 4, the subject matter of Example 1, the first block cipher comprises: a first component to: XOR two 32-bit words of intermediate data; and combine the two XORed 32-bit words of the intermediate data with a round key; and a second component to XOR the round key with the intermediate data.

In Example 5, the subject matter of Example 1, the GF multiplications comprise affine transformations and mapping operations to map an input from $GF(2^8)$ to $GF(2^4)^2$.

In Example 6, the subject matter of Example 1, to reduce a complexity of inverse computations, the Sbox is to map an 8-bit Sbox input from $GF(2^8)$ to a composite field $GF(2^4)^2$ and perform an inverse computation in $GF(2^4)$.

In Example 7, the subject matter of Example 6, to map the 8-bit Sbox input from $GF(2^8)$ to the composite field $GF(2^4)^2$, the combined Sbox is to map the data using a ground-field polynomial and an extension-field polynomial.

In Example 8, the subject matter of Example 1, for an encrypt operation, the Sbox is to merge an affine transformation with an inverse map to map an output from $GF(2^4)^2$ to $GF(2^8)$.

Example 9 is a logic device comprising: a single hardware accelerator to encrypt or decrypt data, the single hardware accelerator comprising: a first block cipher to encrypt or decrypt the data according to a first encryption algorithm; a second block cipher to encrypt or decrypt the data according to a second encryption algorithm; and a combined substitution box (Sbox) coupled to the first block cipher and the second block cipher, the combined Sbox comprising logic to perform Galois Field (GF) multiplications and inverse computations, wherein the inverse computations are common to the first block cipher and the second block cipher.

In Example 10, the subject matter of Example 9, the single hardware accelerator is reconfigurable to implement either the first encryption algorithm or the second encryption algorithm, and wherein the first encryption algorithm is an Advanced Encryption Standard (AES) encryption algorithm and the second encryption algorithm is a SMS4 encryption algorithm.

In Example 11, the subject matter of Example 10, the SoC further comprises a 128-bit encrypt/decrypt datapath, the datapath comprising 12 AES Sbox modules and 4 hybrid Sbox modules for round computation, and 4 hybrid Sbox modules for key expansion.

In Example 12, the subject matter of Example 11, the datapath further comprises: a shared 128-bit intermediate working register; a shared 128-bit key register; and a 128-bit 2:1 multiplexer to select a final round key.

In Example 13, the subject matter of Example 9, the first block cipher comprises: a first component to: XOR two 32-bit words of intermediate data; and combine the two XORed 32-bit words of the intermediate data with a round key; and a second component to XOR the round key with the intermediate data.

In Example 14, the subject matter of Example 9, the GF multiplications comprise affine transformations and mapping operations to map an input from $GF(2^8)$ to $GF(2^4)^2$.

In Example 15, the subject matter of Example 9, to reduce a complexity of inverse computations, the Sbox is to map an 8-bit Sbox input from $GF(2^8)$ to a composite field $GF(2^4)^2$ and perform an inverse computation in $GF(2^4)$.

In Example 16, the subject matter of Example 15, to map the 8-bit Sbox input from $GF(2^8)$ to the composite field $GF(2^4)^2$, the combined Sbox is to map the data using a ground-field polynomial and an extension-field polynomial.

Example 17 is a system, comprising: a circuit board; a processor disposed in a first location of the circuit board; an off-chip logic device operatively coupled to the processor, disposed in a second location of the circuit board, wherein the off-chip logic device comprises: a single hardware accelerator coupled to the processor, the single hardware accelerator to encrypt or decrypt data, the single hardware accelerator comprising: a first block cipher to encrypt or decrypt the data according to a first encryption algorithm; a second block cipher to encrypt or decrypt the data according to a second encryption algorithm; and a combined substitution box (Sbox) coupled to the first block cipher and the second block cipher, the combined Sbox comprising logic to perform Galois Field (GF) multiplications and inverse computations, wherein the inverse computations are common to the first block cipher and the second block cipher.

In Example 18, the subject matter of Example 17, the single hardware accelerator is reconfigurable to implement either the first encryption algorithm or the second encryption algorithm, and wherein the first encryption algorithm is an Advanced Encryption Standard (AES) encryption algorithm and the second encryption algorithm is a SMS4 encryption algorithm.

In Example 19, the subject matter of Example 17, to reduce a complexity of inverse computations, the Sbox is to map an 8-bit Sbox input from $GF(2^8)$ to a composite field $GF(2^4)^2$ and perform an inverse computation in $GF(2^4)$.

In Example 20, the subject matter of Example 19, to map the 8-bit Sbox input from $GF(2^8)$ to the composite field $GF(2^4)^2$, the combined Sbox is to map the data using a ground-field polynomial and an extension-field polynomial.

Example 21 is a System on Chip (SoC) comprising: a processor core; and a single hardware accelerator coupled to the processor core, the single hardware accelerator comprising means for encrypting or decrypting data, the single hardware accelerator comprising: a first block cipher comprising means for encrypting or decrypting the data according to a first encryption algorithm; a second block cipher comprising means for encrypting or decrypting the data according to a second encryption algorithm; and a combined substitution box (Sbox) coupled to the first block cipher and the second block cipher, the combined Sbox comprising means for performing Galois Field (GF) multiplications and inverse computations, wherein the inverse computations are common to the first block cipher and the second block cipher.

In Example 22, the subject matter of Example 21, to reduce a complexity of inverse computations, the Sbox comprises means for mapping an 8-bit Sbox input from $GF(2^8)$ to a composite field $GF(2^4)^2$ and performing an inverse computation in $GF(2^4)$.

In Example 23, the subject matter of Example 22, to map the 8-bit Sbox input from $GF(2^8)$ to the composite field $GF(2^4)^2$, the combined Sbox comprises means for mapping the data using a ground-field polynomial and an extension-field polynomial.

Example 24 is a logic device comprising: a single hardware accelerator comprising means for encrypting or decrypting data, the single hardware accelerator comprising: a first block cipher comprising means for encrypting or decrypting the data according to a first encryption algorithm; a second block cipher comprising means for encrypting or decrypting the data according to a second encryption algorithm; and a combined substitution box (Sbox) coupled to the first block cipher and the second block cipher, the combined Sbox comprising means for performing Galois Field (GF) multiplications and inverse computations, wherein the inverse computations are common to the first block cipher and the second block cipher.

In Example 25, the subject matter of Example 24, to reduce a complexity of inverse computations, the Sbox comprises means for mapping an 8-bit Sbox input from $GF(2^8)$ to a composite field $GF(2^4)^2$ and performing an inverse computation in $GF(2^4)$.

In Example 26, the subject matter of Example 25, to map the 8-bit Sbox input from $GF(2^8)$ to the composite field $GF(2^4)^2$, the combined Sbox comprises means for mapping the data using a ground-field polynomial and an extension-field polynomial.

Example 27 is a system, comprising: a circuit board; a processor disposed in a first location of the circuit board; an off-chip logic device operatively coupled to the processor, disposed in a second location of the circuit board, wherein the off-chip logic device comprises: a single hardware accelerator coupled to the processor, the single hardware accelerator comprising means for encrypting or decrypting data, the single hardware accelerator comprising: a first block cipher comprising means for encrypting or decrypting data the data according to a first encryption algorithm; a second block cipher comprising means for encrypting or decrypting data the data according to a second encryption algorithm; and a combined substitution box (Sbox) coupled to the first block cipher and the second block cipher, the combined Sbox comprising means for performing Galois Field (GF) multiplications and inverse computations, wherein the inverse computations are common to the first block cipher and the second block cipher.

In Example 28, the subject matter of Example 27, to reduce a complexity of inverse computations, the Sbox comprises means for mapping an 8-bit Sbox input from $GF(2^8)$ to a composite field $GF(2^4)^2$ and performing an inverse computation in $GF(2^4)$.

In Example 29, the subject matter of Example 28, to map the 8-bit Sbox input from $GF(2^8)$ to the composite field $GF(2^4)^2$, the combined Sbox comprises means for mapping the data using a ground-field polynomial and an extension-field polynomial.

Example 30 is an apparatus comprising: a processor core; and a single hardware accelerator coupled to the processor core, the single hardware accelerator comprising means for encrypting or decrypting data, the single hardware accelerator comprising: a first block cipher comprising means for encrypting or decrypting the data according to a first encryption algorithm; a second block cipher comprising means for encrypting or decrypting the data according to a second encryption algorithm; and a combined substitution box (Sbox) coupled to the first block cipher and the second block cipher, the combined Sbox comprising means for performing Galois Field (GF) multiplications and inverse computations, wherein the inverse computations are common to the first block cipher and the second block cipher.

In Example 31, the subject matter of Example 30, to reduce a complexity of inverse computations, the Sbox comprises means for mapping an 8-bit Sbox input from $GF(2^8)$ to a composite field $GF(2^4)^2$ and performing an inverse computation in $GF(2^4)$.

In Example 32, the subject matter of Example 31, to map the 8-bit Sbox input from $GF(2^8)$ to the composite field $GF(2^4)^2$, the combined Sbox comprises means for mapping the data using a ground-field polynomial and an extension-field polynomial.

While embodiments of the present disclosure have been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of embodiments of the present disclosure. It will be apparent, however, to one skilled in the art that these specific details need not be employed to practice embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring embodiments of the present disclosure.

The embodiments are described with reference to hybrid AES-SMS4 hardware accelerator operations in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, embodiments of the present disclosure are not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypt," "decrypt," "perform," multiplications," "key expansion," "add," "mix," "reduce," "merge," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A System on Chip (SoC) comprising:
    a processor core; and
    a single hardware accelerator coupled to the processor core, the single hardware accelerator to encrypt or decrypt data, the single hardware accelerator comprising:
        a first block cipher to encrypt or decrypt the data according to a first encryption algorithm;
        a second block cipher to encrypt or decrypt the data according to a second encryption algorithm; and
        a combined substitution box (Sbox) coupled to receive input from the first block cipher and the second block cipher for common computations, the combined Sbox comprising logic to perform Galois Field (GF) multiplications and inverse computations, wherein the inverse computations are in a common ground-field and extension-field polynomial for the first encryption algorithm of the first block cipher and for the second encryption algorithm of the second block cipher to provide a hybrid Sbox design.

2. The SoC of claim 1, wherein the single hardware accelerator is reconfigurable to implement either the first encryption algorithm or the second encryption algorithm, and wherein the first encryption algorithm is an Advanced Encryption Standard (AES) encryption algorithm and the second encryption algorithm is a SMS4 encryption algorithm.

3. The SoC of claim 2, wherein the SoC further comprises a 128-bit encrypt/decrypt datapath, the datapath comprising 12 AES Sbox modules and 4 hybrid Sbox modules for round computation, and 4 hybrid Sbox modules for key expansion.

4. The SoC of claim 1, wherein the first block cipher comprises:
    a first component to:
        XOR two 32-bit words of intermediate data; and
        combine the two XORed 32-bit words of the intermediate data with a round key; and
    a second component to XOR the round key with the intermediate data.

5. The SoC of claim 1, wherein the GF multiplications comprise affine transformations and mapping operations to map an input from $GF(2^8)$ to $GF(2^4)^2$.

6. The SoC of claim 1, wherein to reduce a complexity of inverse computations, the Sbox is to map an 8-bit Sbox input from $GF(2^8)$ to a composite field $GF(2^4)^2$ and perform an inverse computation in $GF(2^4)$.

7. The SoC of claim 6, wherein to map the 8-bit Sbox input from $GF(2^8)$ to the composite field $GF(2^4)^2$, the combined Sbox is to map the data using the common ground-field and the extension-field polynomial.

8. The SoC of claim 1, wherein, for an encrypt operation, the Sbox is to merge an affine transformation with an inverse map to map an output from $GF(2^4)^2$ to $GF(2^8)$.

9. A logic device comprising:
    a single hardware accelerator to encrypt or decrypt data, the single hardware accelerator comprising:
        a first block cipher to encrypt or decrypt the data according to a first encryption algorithm;
        a second block cipher to encrypt or decrypt the data according to a second encryption algorithm; and
        a combined substitution box (Sbox) coupled to receive input from the first block cipher and the second block cipher for common computations, the combined Sbox comprising logic to perform Galois Field (GF) multiplications and inverse computations, wherein the inverse computations are in a common ground-field and extension-field polynomial for the first encryption algorithm of the first block cipher and for the second encryption algorithm of the second block cipher to provide a hybrid Sbox design.

10. The logic device of claim 9, wherein the single hardware accelerator is reconfigurable to implement either the first encryption algorithm or the second encryption algorithm, and wherein the first encryption algorithm is an Advanced Encryption Standard (AES) encryption algorithm and the second encryption algorithm is a SMS4 encryption algorithm.

11. The logic device of claim 10, wherein the logic device further comprises a 128-bit encrypt/decrypt datapath, the datapath comprising 12 AES Sbox modules and 4 hybrid Sbox modules for round computation, and 4 hybrid Sbox modules for key expansion.

12. The logic device of claim 11, wherein the datapath further comprises:
    a shared 128-bit intermediate working register;
    a shared 128-bit key register; and a 128-bit 2:1 multiplexer to select a final round key.

13. The logic device of claim 9, wherein the first block cipher comprises:
    a first component to:
        XOR two 32-bit words of intermediate data; and
        combine the two XORed 32-bit words of the intermediate data with a round key; and
    a second component to XOR the round key with the intermediate data.

14. The logic device of claim 9, wherein the GF multiplications comprise affine transformations and mapping operations to map an input from $GF(2^8)$ to $GF(2^4)^2$.

15. The logic device of claim 9, wherein, to reduce a complexity of inverse computations, the Sbox is to map an 8-bit Sbox input from $GF(2^8)$ to a composite field $GF(2^4)^2$ and perform an inverse computation in $GF(2^4)$.

16. The logic device of claim 15, wherein to map the 8-bit Sbox input from $GF(2^8)$ to the composite field $GF(2^4)^2$, the combined Sbox is to map the data using the common ground-field and the extension-field polynomial.

17. A system, comprising:
    a circuit board;
    a processor disposed in a first location of the circuit board;
    an off-chip logic device operatively coupled to the processor, disposed in a second location of the circuit board, wherein the off-chip logic device comprises:

a single hardware accelerator coupled to the processor, the single hardware accelerator to encrypt or decrypt data, the single hardware accelerator comprising: a first block cipher to encrypt or decrypt the data according to a first encryption algorithm;

a second block cipher to encrypt or decrypt the data according to a second encryption algorithm; and a combined substitution box (Sbox) coupled to receive input from the first block cipher and the second block cipher for common computations, the combined Sbox comprising logic to perform Galois Field (GF) multiplications and inverse computations, wherein the inverse computations are in a common ground-field and extension-field polynomial for the first encryption algorithm of the first block cipher and for the second encryption algorithm of the second block cipher to provide a hybrid Sbox design.

18. The system of claim 17, wherein the single hardware accelerator is reconfigurable to implement either the first encryption algorithm or the second encryption algorithm, and wherein the first encryption algorithm is an Advanced Encryption Standard (AES) encryption algorithm and the second encryption algorithm is a SMS4 encryption algorithm.

19. The system of claim 17, wherein, to reduce a complexity of inverse computations, the Sbox is to map an 8-bit Sbox input from $GF(2^8)$ to a composite field $GF(2^4)^2$ and perform an inverse computation in $GF(2^4)$.

20. The system of claim 19, wherein to map the 8-bit Sbox input from $GF(2^8)$ to the composite field $GF(2^4)^2$, the combined Sbox is to map the data using the common ground-field and the extension-field polynomial.

* * * * *